(12) United States Patent
Hsu

(10) Patent No.: US 8,480,392 B2
(45) Date of Patent: Jul. 9, 2013

(54) LEVEL ADJUSTMENT DEVICE FOR INJECTION MOLDING MACHINE

(75) Inventor: Chia-Ling Hsu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 439 days.

(21) Appl. No.: 12/949,817

(22) Filed: Nov. 19, 2010

(65) Prior Publication Data

US 2012/0070527 A1 Mar. 22, 2012

(30) Foreign Application Priority Data

Sep. 17, 2010 (TW) ................................ 99131533 A

(51) Int. Cl.
*B28B 17/00* (2006.01)

(52) U.S. Cl.
USPC ............. 425/186; 425/190; 269/68; 269/225; 248/188.2; 33/1 M; 33/333

(58) Field of Classification Search
USPC ............... 425/190, 186; 74/425; 269/43, 246, 269/68, 225, 229; 33/1 M, 333, 568; 248/188.2, 248/292.12
See application file for complete search history.

(56) References Cited

U.S. PATENT DOCUMENTS

| | | | | |
|---|---|---|---|---|
| 4,500,235 A | * | 2/1985 | Johnsen | 408/238 |
| 4,755,124 A | * | 7/1988 | Tanaka et al. | 425/149 |
| 5,164,203 A | * | 11/1992 | Tanaka et al. | 425/149 |
| 2002/0101017 A1 | * | 8/2002 | Kolarik | 269/43 |
| 2007/0098839 A1 | * | 5/2007 | Dieno et al. | 425/589 |
| 2008/0131551 A1 | * | 6/2008 | Hirata | 425/529 |

* cited by examiner

*Primary Examiner* — Yogendra Gupta
*Assistant Examiner* — Ninh Le
(74) *Attorney, Agent, or Firm* — Altis Law Group, Inc.

(57) ABSTRACT

A level adjustment device includes a main body, four shaft seats, two adjusting elements, two actuating gears, and a supporting plate. The main body has a side surface and an upper surface connected to the side surface. The main body defines two slots in the side surface. Each two shaft seats are positioned at two opposite sides of a corresponding one of the slots and extend outwards from the side surface. Each of the adjusting elements includes a toothed portion and a supporting portion, the toothed portion movably received in the slot and the supporting portion protruding out of the upper surface. Each of two actuating gears is rotatably sleeved between two corresponding shaft seats and meshes with the toothed portion. The supporting plate is supported on the two adjustment elements above the upper surface.

9 Claims, 3 Drawing Sheets

LEVEL ADJUSTMENT DEVICE FOR INJECTION MOLDING MACHINE

BACKGROUND

1. Technical Field

The present disclosure relates to molding technologies and, particularly, to a level adjustment device for a mold.

2. Description of Related Art

In some cases, the level of molds used in injection molding machines is important to the precision of the process. Adjustment of levels of mold can involve placing a spirit level ruler on an upper horizontal surface of the mold and adjusting the mold after placement on the injection molding machine accordingly. This is inconvenient.

Therefore, it is desirable to provide a level adjustment device which can overcome the limitations described.

DETAILED DESCRIPTION

Embodiments of the disclosure will now be described in detail, with reference to the accompanying drawings.

Figure 1:
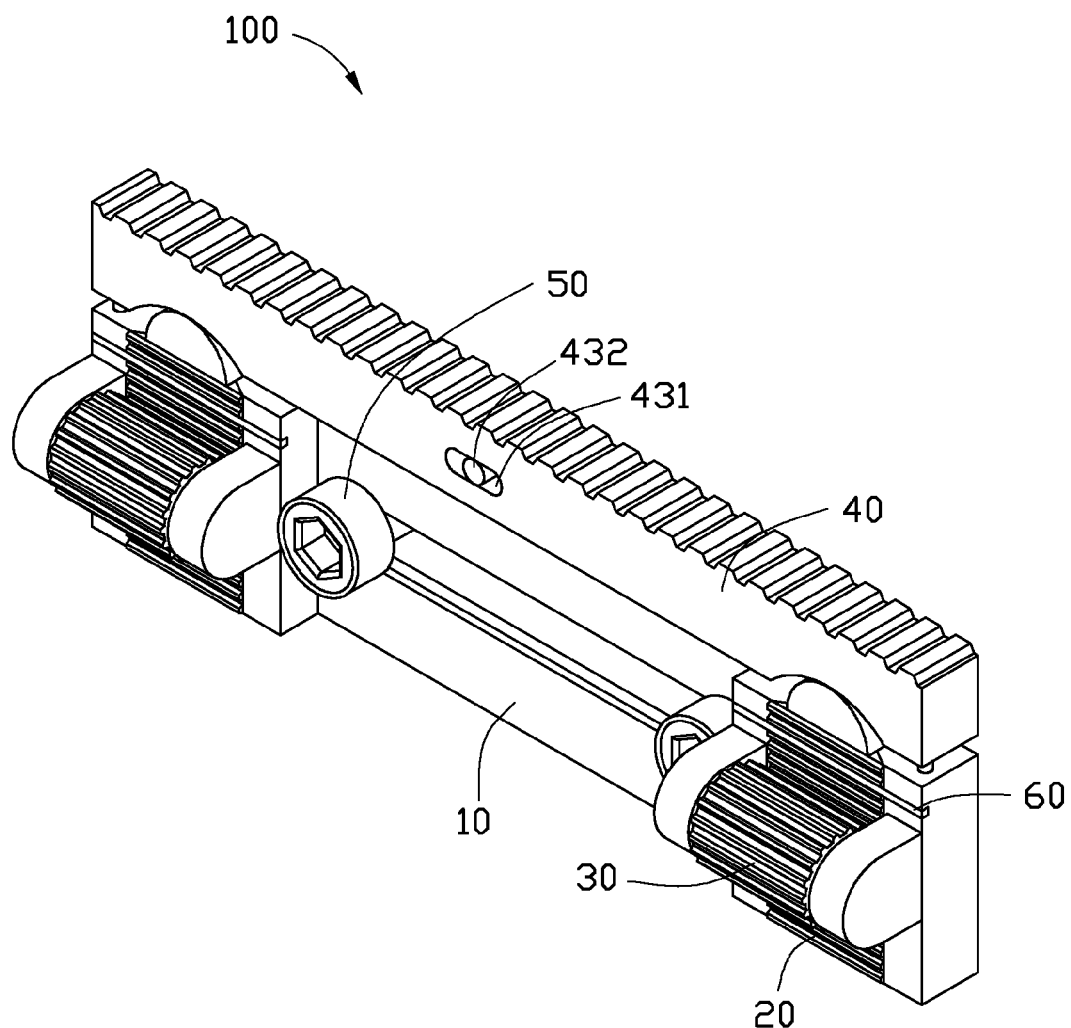
FIG. 1 is a schematic and isometric view of a level adjustment device in accordance with an exemplary embodiment.
Figure 2:
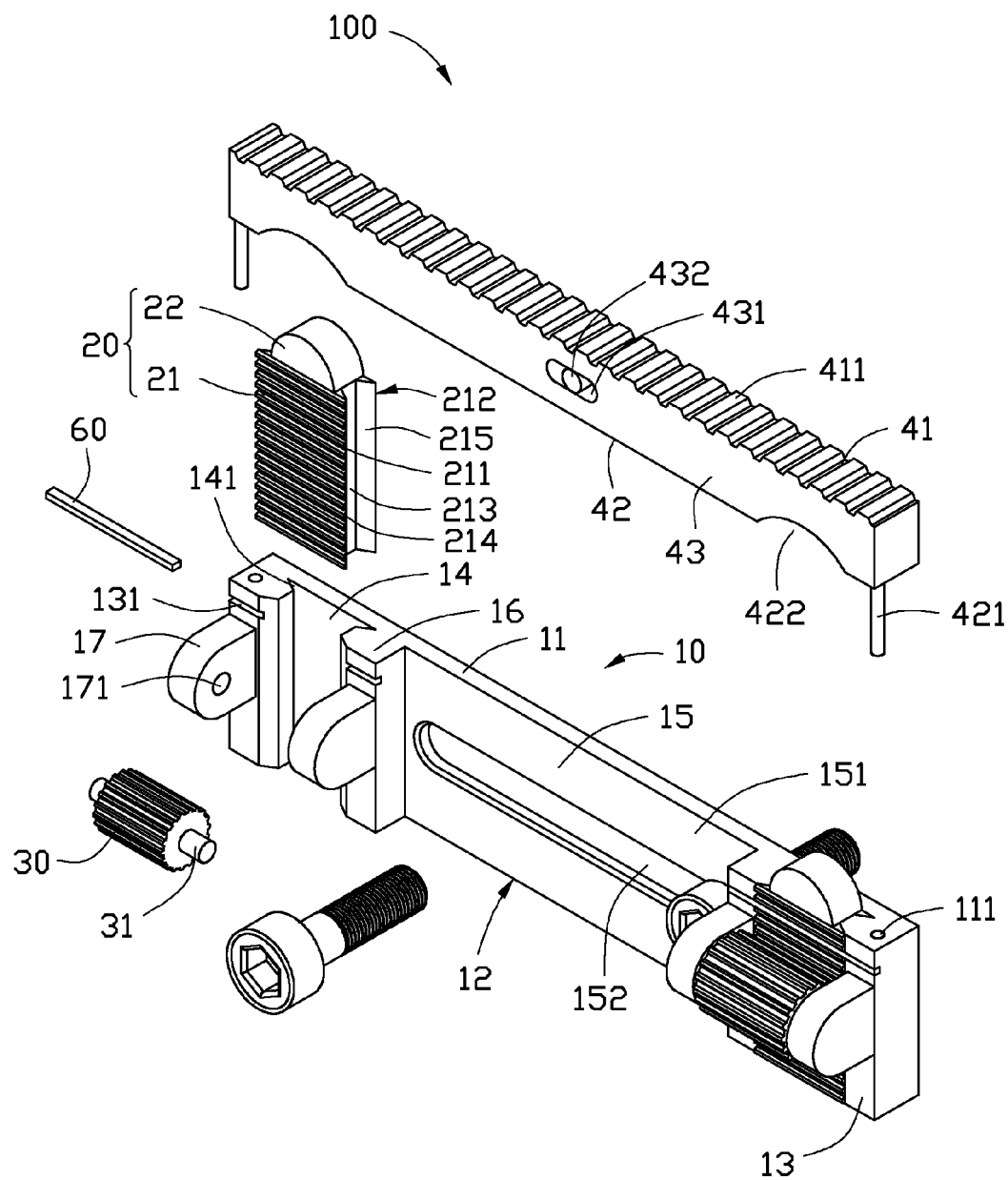
FIG. 2 is an isometric, exploded view of the level adjustment device of FIG. 1.
Figure 3:
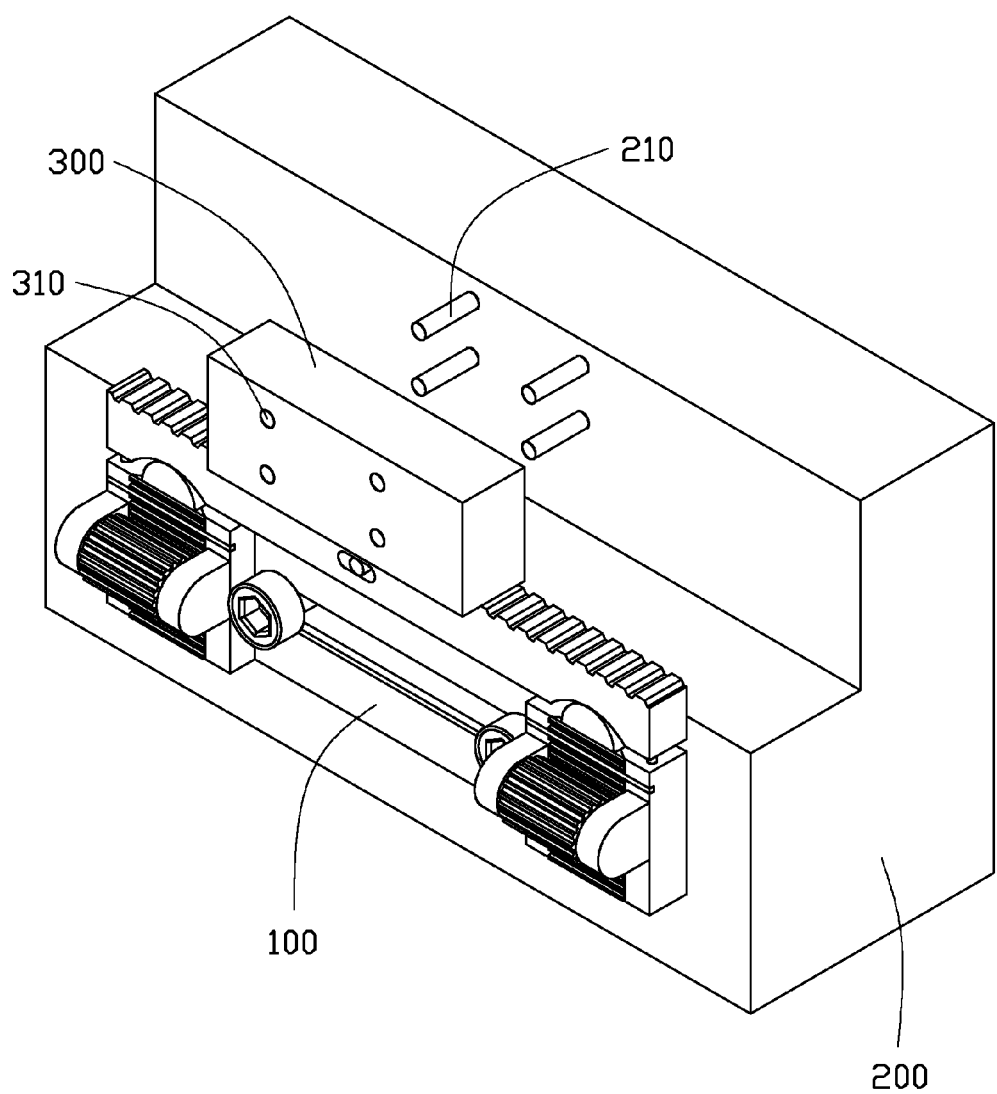
FIG. 3 is an isometric view illustrating operation of the level adjustment device of FIG. 1.

Referring to FIGS. 1-2, a level adjustment device 100, according to an exemplary embodiment, is provided to adjust the level of a mold 300 (shown in FIG. 3). The level adjustment device 100 includes a main body 10, two adjustment elements 20, two actuating gears 30, a supporting plate 40, two fasteners 50, and two stopping strips 60.

The main body 10 is a longitudinal plate and includes a first upper surface 11, a first bottom surface 12, and a first side surface 13 interconnecting the first upper surface 11 and the first bottom surface 12. The main body 10 defines two first slots 14 and a second slot 15 on the first side surface 13. The two first slots 14 and the second slot 15 extend from the first upper surface 11 to the first bottom surface 12 substantially perpendicular to the first upper surface 11 and the first bottom surface 12. The second slot 15 is positioned at the center of the first side surface 13 and the first slots 14 are positioned at two opposite sides of the second slot 15, leaving four side blocks 16 on the main body 10. Each first slot 14 is defined between two corresponding side blocks 16. The width of the second slot 15, along the longitudinal axis of the main body 10, exceeds that of the first slot 14.

Each of the first slots 14 defines two guide grooves 141 in two opposite side surfaces of the corresponding two side blocks 16. The guide grooves 141 are triangular prism configuration and adjacent to the bottom surface of the first slots 14. The second slot 15 comprises a second side surface 151 interconnecting the first upper surface 11 and the first bottom surface 12. The main body 10 defines a notch 152 along the longitudinal axis thereof on the second side surface 151. Each of the two side blocks 16 located at the two ends of the main body 10 defines a guide hole 111 on the first upper surface 11. The extending direction of the guide holes 111 is substantially parallel to the longitudinal axis of the side blocks 16. Each of the side blocks 16 extends a shaft seat 17 upward from the first side surface 13, generally on the middle thereof. Each of the shaft seats 17 defines a shaft hole 171 in the center thereof, extending substantially parallel to the first upper surface 11. The two shaft holes 171 at the same side of the second slot 15 face and are aligned with each other. Each of the side blocks 16 defines a stopping groove 131 on the first side surface 13 between the corresponding shaft seat 17 and the first upper surface 11. The stopping grooves 131 extend substantially parallel to the first upper surface 11 and communicate with the corresponding first slots 14 and the second slot 15.

Each of the adjustment elements 20 includes a toothed portion 21 and a supporting portion 22 extending outward from one end of the toothed portion 21. The toothed portion 21 is received in the corresponding first slot 14 and includes a front surface 211, a rear surface 212, and two third side surfaces 213. A number of teeth 214 extend upward from the front surface 211 and protrude out of the third side surfaces 213. The pitch between two adjacent teeth 214 is equal to the width of the stopping grooves 131. Two guide rails 215 extend outward from the two third side surfaces 213 of each adjustment element 20 respectively. Each of the guide rails 215 is triangular prism configuration corresponding to the guide groove 141 and one surface of the guide rail 215 is coplanar with the rear surface 212. The supporting portion 22 is semi-circular.

Each actuating gear 30 is a circumferential gear and comprises two shafts 31. The two shafts 31 are positioned at two opposite ends of the actuating gear 30. Each of the actuating gears 30 is fixed between the two shaft seats 17, with the shafts 31 are sleeved in the shaft holes 171. The actuating gears 30 engage the toothed portions 21 correspondingly.

The supporting plate 40 is a longitudinal plate, and includes a second upper surface 41, a second bottom surface 42, and a fourth side surface 43 interconnecting the second upper surface 41 and the second bottom surface 42. A number of protruding strips 411 extend upward from the second upper surface 41. The protruding strips 411 are configured to increase friction with the second upper surface 41. Two guide poles 421 corresponding to the guide holes 111 extend downward from two ends of the second bottom surface 42. The internal diameter of the guide holes 111 exceeds the external diameter of the guide poles 421. The second bottom surface 42 defines two semicircular position grooves 422 between the two guide poles 421. The position grooves 422 are adjacent to the guide poles 421. A level observation window 431 is positioned on the fourth side surface 43 and filled with liquid. The level observation window 431 includes a leveling gas bubble 432.

In assembly, the guide rails 215 of the toothed portion 21 are movably received in the guide grooves 141 of the first slots 14, and the supporting portion 22 protrudes from the upper surface 11 of the main body 10. The stopping strips 60 are received between two adjacent teeth 214 and in the stopping grooves 131 to stop the adjustment elements 20 in the first slots 14. The supporting plate 40 contacts the two adjustment elements 20. The guide poles 421 are movably sleeved in the guide holes 111, and the supporting portions 22 are received in the position grooves 422.

Referring to FIG. 3, in use, the level adjustment device 100 is fixed on an injection molding machine 200 with the fasteners 50 passing through the notch 152. The injection molding machine 200 includes a number of fixing poles 210 for assembling a mold 300. The mold 300 is placed on the supporting plate 40, the stopping strips 60 are removed from the stopping grooves 131. The actuating gears 30 are rotated clockwise or counterclockwise, and the adjustment elements 20 are actuated to move up or down by the actuating gears 30. The level of the mold 300 is adjusted until the level gas bubble 432 is at the middle of the level observation window 431 and the fixing holes 310 of the mold 300 are aligned with the fixing poles 210 of the injection molding machine 200. The stopping strips 60 are received between two adjacent teeth 214 and in the stopping grooves 131 to stop the adjustment elements 20 in the first slots 14. The mold 300 is assembled on the injection molding machine 200 with the fixing poles 210 sleeved in the fixing holes 310.

The present disclosure provides a level adjustment device adjusting the level of the mold by operating the actuating gears and the adjustment elements. It is convenient to adjust the level of the mold before the mold is placed on the injection molding machine.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A level adjustment device for an injection molding machine, comprising:

a main body having a first side surface, a first upper surface, and a first bottom surface, the first side surface perpendicularly interconnected to the first upper surface and the first bottom surface, the main body defining two first slots and a second slot in the first side surface, the second slot defined between the two first slots, leaving four side blocks on the main body, each first slot defined between two corresponding side blocks;

four shaft seats, each two of the shaft seats positioned at two opposite sides of a corresponding one of the first slots and extending outwards from the first side surface;

two adjusting elements, each adjusting element comprising a toothed portion and a supporting portion, the toothed portion movably receiving in the first slot and the supporting portion protruding out of the first upper surface of the main body;

two actuating gears, each actuating gear rotatably sleeved between two corresponding shaft seats and engaging a corresponding toothed portion; and a supporting plate supported upon the two adjusting elements above the first upper surface.

2. The level adjustment device of claim 1, wherein the main body defines two guide holes in the first upper surface, an extending direction of the guide holes is substantially parallel to a longitudinal axis of each side block.

3. The level adjustment device of claim 2, wherein the supporting plate comprises a second upper surface, a second bottom surface, and a fourth side surface connected to the second upper and second bottom surfaces; two guide poles extend downward from two ends of the second bottom surface and correspond to the guide holes.

4. The level adjustment device of claim 3, wherein a plurality of protruding strips extends upward from the second upper surface and is configured to increase friction with the second upper surface.

5. The level adjustment device of claim 3, wherein a level observation window is positioned on the fourth side surface and filled with liquid, the level observation window comprises a level gas bubble.

6. The level adjustment device of claim 1, wherein each first slot defines two guide grooves in two opposite side surfaces of the two corresponding side blocks.

7. The level adjustment device of claim 6, wherein the toothed portion comprises a front surface, a rear surface, and two opposite third side surfaces, a plurality of teeth extends outward from the front surface, two guide rails extend outward from the two third side surfaces respectively and are received in two corresponding guide grooves.

8. The level adjustment device of claim 7, wherein each of the side blocks defines a stopping groove in the first side surface between the corresponding shaft seat and the first upper surface, the stopping grooves extend substantially parallel to the first upper surface.

9. The level adjustment device of claim 8, further comprising two stopping strips received in the stopping grooves correspondingly, each stopping strip positioned between two adjacent teeth to stop a corresponding adjustment element in the first slot.

* * * * *